(12) United States Patent
Andre Poyaud

(10) Patent No.: US 11,488,735 B2
(45) Date of Patent: Nov. 1, 2022

(54) METHOD FOR DETERMINING AT LEAST ONE THRESHOLD VALUE OF AT LEAST ONE OPERATING PARAMETER OF A NUCLEAR REACTOR, AND ASSOCIATED COMPUTER PROGRAM AND ELECTRONIC SYSTEM

(71) Applicant: FRAMATOME, Courbevoie (FR)

(72) Inventor: Gilles Andre Poyaud, Lyons (FR)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 16/772,787

(22) PCT Filed: Dec. 18, 2018

(86) PCT No.: PCT/EP2018/085662
§ 371 (c)(1),
(2) Date: Jun. 14, 2020

(87) PCT Pub. No.: WO2019/121791
PCT Pub. Date: Jun. 27, 2019

(65) Prior Publication Data
US 2020/0335236 A1   Oct. 22, 2020

(30) Foreign Application Priority Data
Dec. 18, 2017   (FR) ..................................... 17 62391

(51) Int. Cl.
*G21D 3/00* (2006.01)
*G21C 17/108* (2006.01)
(Continued)

(52) U.S. Cl.
CPC ............. *G21D 3/001* (2013.01); *G21C 3/047* (2019.01); *G21C 17/108* (2013.01);
(Continued)

(58) Field of Classification Search
CPC ........ G21D 3/001; G21D 3/002; G21D 3/004; G21D 3/005; G21D 3/007; G21D 3/04;
(Continued)

(56) References Cited

U.S. PATENT DOCUMENTS 4,057,466 A * 11/1977 Thompson ............... G21C 7/00
                                                              376/217
4,153,506 A *  5/1979 Maki ........................ G21C 7/00
                                                              376/418
(Continued)

FOREIGN PATENT DOCUMENTS

EP   1556870 B1   11/2017
JP   S63193090 A   8/1988
(Continued)

OTHER PUBLICATIONS

Corresponding Search Report PCT/EP2018/085662.
(Continued)

*Primary Examiner* — Darlene M Ritchie
(74) *Attorney, Agent, or Firm* — Davidson, Davidson & Kappel, LLC

(57) ABSTRACT

A method for determining at least one threshold value of at least one operating parameter of a nuclear reactor is implemented by an electronic determination system and includes the steps of determining a first threshold value of a respective operating parameter for an operation of the reactor at a first power; and determining a second threshold value of said parameter for an operation of the reactor at a second power. The operation at the lower power of the first and second powers is an operation continued for a duration of at least 8 hours over a 24-hour sliding window. The method also includes determining a third threshold value of said parameter for an operation of the reactor at a third power between the first power and the second power.

18 Claims, 8 Drawing Sheets

(51) Int. Cl.
  *G21C 17/112* (2006.01)
  *G21C 3/04* (2006.01)
  *G21D 3/10* (2006.01)
  *G21C 7/36* (2006.01)
  *G21D 3/04* (2006.01)

(52) U.S. Cl.
  CPC ............ *G21C 17/112* (2013.01); *G21D 3/10* (2013.01); *G21C 7/36* (2013.01); *G21D 3/04* (2013.01)

(58) Field of Classification Search
  CPC .. G21D 3/10; G21D 3/08; G21D 3/12; G21D 3/14; G21D 3/16; G21D 3/18; G21D 3/00; G21C 3/047; G21C 17/108; G21C 7/36; G21C 17/112; Y02E 30/00; Y02E 30/30
  USPC ........................................................ 376/241
  See application file for complete search history.

(56) References Cited

U.S. PATENT DOCUMENTS

| | | | | |
|---|---|---|---|---|
| 4,555,382 A | * | 11/1985 | Delor | G21C 17/108 376/216 |
| 4,836,973 A | | 6/1989 | Foret | |
| 5,091,139 A | | 2/1992 | Chao et al. | |
| 6,021,169 A | * | 2/2000 | Robertson | F22B 35/004 376/241 |
| 2004/0071253 A1 | * | 4/2004 | McFetridge | G21D 3/001 376/216 |
| 2006/0129362 A1 | | 6/2006 | Mahe et al. | |
| 2009/0080585 A1 | | 3/2009 | Farawila | |
| 2010/0260300 A1 | | 10/2010 | Andre Poyaud et al. | |
| 2012/0219101 A1 | * | 8/2012 | L'Abbate | G21C 7/00 376/215 |
| 2015/0146836 A1 | * | 5/2015 | Takado | G21C 7/00 376/241 |

FOREIGN PATENT DOCUMENTS

JP    H0365693 A     3/1991
JP    2011506920 A   3/2011

OTHER PUBLICATIONS

Vincent Bessiron: "Areva's PCT Methodologies for PWR Enhanced Plant Maneuverability", Jan. 1, 2014. URL:https://inis.iaea.org/search/search.aspx?orig_g=RN:47079965.

Daniel et al., "AREVA NP's PCI methodologies for PWR enhanced plant maneuverability," published in Jun. 2016.

* cited by examiner

FIG.1 -Prior Art-

-Prior Art-

METHOD FOR DETERMINING AT LEAST ONE THRESHOLD VALUE OF AT LEAST ONE OPERATING PARAMETER OF A NUCLEAR REACTOR, AND ASSOCIATED COMPUTER PROGRAM AND ELECTRONIC SYSTEM

The present invention relates to a method for determining at least one threshold value of at least one operating parameter of a nuclear reactor.

The nuclear reactor comprises a core in which fuel assemblies are loaded, the fuel assemblies comprising fuel rods each including nuclear fuel pellets and a cladding surrounding the pellets.

The present invention also relates to an associated electronic determining system, and a computer program including software instructions which, when executed by a computer, implement such a method.

The invention for example applies to light water nuclear reactors, whether using pressurized water or boiling water.

BACKGROUND

A large number of these reactors are currently used around the world.

It may be useful, in particular in countries such as France, where more than 50% of electricity is produced using nuclear reactors, for the overall power supplied by these reactors to vary in order to adapt to the needs of the electrical grid that they supply.

In particular, it is desirable to be able to operate the nuclear reactors at an intermediate power during a prolonged period during which the demand of the grid is low, typically from several days to at least 2 months, before returning to the rated power. The operating power is considered to be an intermediate power when it is below 92% of the rated power.

The article "*AREVA NP's PCI methodologies for PWR enhanced plant maneuverability*" by L. Daniel et al, published in late June 2016, describes a method for determining threshold values of at least one operating parameter of a nuclear reactor, these threshold values being associated with protection thresholds. This method comprises determining a first protection threshold corresponding to a first threshold value of the respective operating parameter, for operation at a first power of the reactor, such as the rated power.

With a view to a sustained operation at intermediate power (SOIP) of the reactor, the method also comprises determining a second protection threshold corresponding to a second threshold value of the respective operating parameter, for operation at a second power of the reactor, such as the intermediate power associated with the SOIP, that is to say, a power lower than the rated power, generally expressed in the form of a percentage of the rated power, typically between 10% and 92% of the rated power.

Each protection threshold, or limit threshold associated with the respective operating parameter, and in particular the second threshold value of said operating parameter, associated in this example with the SOIP, is determined through the calculation of a PCI (Pellet-Cladding Interaction) margin, such that the PCI margin remains positive despite this change to the power of the reactor.

In some cases, it may be necessary to operate a reactor over extra long periods at low power (extra-long SOIP), for example following a downtime of equipment or a leak on the secondary circuit of the nuclear reactor, and in general following an event leading to discharging heat less well and therefore having to lower the power of the nuclear reactor.

The aim is to use the reactor to the best of its capacities while continuing to operate it at a highest possible power.

For all that, such an operation of a nuclear reactor must not cause a safety problem, in particular in case of accidental operational transients that may occur for example during the SOIP, or shortly after a return to power following a sustained operation and intermediate power.

SUMMARY

One aim of the present disclosure is to address this problem by providing a method for determining at least one threshold value of at least one operating parameter of a nuclear reactor, making it possible to better use the capacities of the reactor, while retaining a safe operation.

To that end, a method is provided for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the method being implemented by an electronic determination system and comprising the following steps:
determining a first threshold value of a respective operating parameter for an operation of the nuclear reactor at a first power;
determining a second threshold value of a respective operating parameter for an operation of said nuclear reactor at a second power;
the operation at the lower power of the first and second powers being an operation continued for a duration of at least 8 hours over a 24-hour sliding window;
wherein the method further comprises the following step:
determining a third threshold value of said respective operating parameter for an operation of said nuclear reactor at a third power, the third power corresponding to a power level and being between the first power and the second power.

The determination method according to the present disclosure then makes it possible to determine the threshold value of the operating parameter for at least one power level between the first power and the second power. Each determined threshold value of the operating parameter is associated with a protection threshold, each threshold value in fact corresponding to a threshold not to be exceeded in order to ensure the protection of the nuclear reactor, that is to say, its operating safety.

Computing at least one such power level with determination of the associated threshold value of the operating parameter and the associated protection threshold, then makes it possible to better exploit the capacities of the reactor.

Indeed, such a power level makes it possible to improve the management of the variation of the power with a greater safety margin and/or a greater possible operating duration in SOIP, whether during a decrease in the power, in the rated power to the lowest power associated with the SOIP, that is to say, in the thermomechanical deconditioning mode of fuel rods, or during a rising of the power, from the lowest power associated with the SOIP to the rated power, that is to say, in thermomechanical reconditioning mode of the fuel rods.

Each limit value of the respective operating parameter, associated with a protection threshold, is for example determined via the calculation of the PCI margin, such that the PCI margin remains positive despite a change in the power of the reactor.

According to other advantageous aspects, the determination method comprises one or more of the following features, considered alone or according to all technically possible combinations:

the nuclear reactor is in a thermomechanical deconditioning mode of the fuel rods, and the first power is greater than the second power, the first power preferably being substantially equal to the rated power of the nuclear reactor, and the second power preferably being substantially equal to a target power for a sustained operation at intermediate power of the nuclear reactor;

the nuclear reactor is in a thermomechanical reconditioning mode of the fuel rods, and the first power is less than the second power, the first power preferably being substantially equal to a target power for a sustained operation at intermediate power of the nuclear reactor, and the second power preferably being substantially equal to the rated power of the nuclear reactor;

the operating parameter is selected from the following group: a temperature deviation in the core, a linear power in the fuel rods and a neutron flux variation in the core;

each threshold value of the respective operating parameter is determined via a calculation of a PCI margin;

the calculation of the PCI margin comprises the following sub-steps:
ii) simulating at least one operating transition of the nuclear reactor,
iii) calculating the value reached by at least one physical property during the operating transition in at least part of a cladding of a fuel rod, and
iv) determining, as PCI margin, the deviation between the maximum value reached by said value calculated in sub-step ii) during the transition and a technological limit of the fuel rod;

the transition simulated in sub-step ii) is a transition chosen from among the group consisting of: an excessive load increase, an uncontrolled withdrawal of at least one group of control clusters, a fall of one of the control clusters, and an uncontrolled dilution of boric acid;

the physical property is selected from the group consisting of: a constraint or a constraint function in the cladding; and a deformation energy density in the cladding;

the method further comprises a step consisting of operating the nuclear reactor while verifying that the value of the operating parameter is below the respective threshold value of the operating parameter among the first, second and third threshold values for the operation of the nuclear reactor at the corresponding power among the first, second and third powers;

during the operation of the nuclear reactor, after a thermomechanical deconditioning followed by a thermomechanical reconditioning of the fuel rods leading to a local combustion rate of the fuel rods, a minimum operating duration of the nuclear reactor at its rated power before a new thermomechanical deconditioning of the fuel rods is the duration corresponding to reaching a target PCI margin, the target PCI margin corresponding, starting from the PCI margin existing before the thermomechanical deconditioning of the fuel rods, to the PCI margin that would have resulted from an operation at rated power of the reactor until obtaining the same local combustion rate; and each threshold value of the respective operating parameter is a threshold value associated with a protection threshold leading to the triggering of an emergency stop of the reactor and/or an alarm.

A computer program is also provided including software instructions which, when executed by a computer, implement a determination method as defined above.

An electronic system is also provided for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the system comprising:

a first determination module configured to determine a first threshold value of a respective operating parameter for an operation of the nuclear reactor at a first power;

a second determination module configured to determine a second threshold value of a respective operating parameter for an operation of said nuclear reactor at a second power;

the operation at the lower power of the first and second powers being an operation continued for a duration of at least 8 hours over a 24-hour sliding window; and a third determination module configured to determine a third threshold value of said respective operating parameter for an operation of said nuclear reactor at a third power, the third power corresponding to a power level and being between the first power and the second power.

BRIEF SUMMARY OF THE DRAWINGS

These features and advantages of the invention will appear more clearly upon reading the following description, provided solely as a non-limiting example, and done in reference to the appended drawings, in which.

DETAILED DESCRIPTION

In the remainder of the description, the expression "substantially equal to" defines a relationship of equality to within plus or minus 10%, preferably to within plus or minus 5%.

In the remainder of the description, the term "duration" generally defines a period of time, or time period, between two instants, the value of which then corresponds to the difference between these two instants.

Thus, a duration corresponding to an instant (final) $T_f$ counted down from an initial instant $T_i$, will correspond to the difference between these two instants $T_f$, that is to say $T_f - T_i$, and will also be denoted in this manner.

Figure 1:
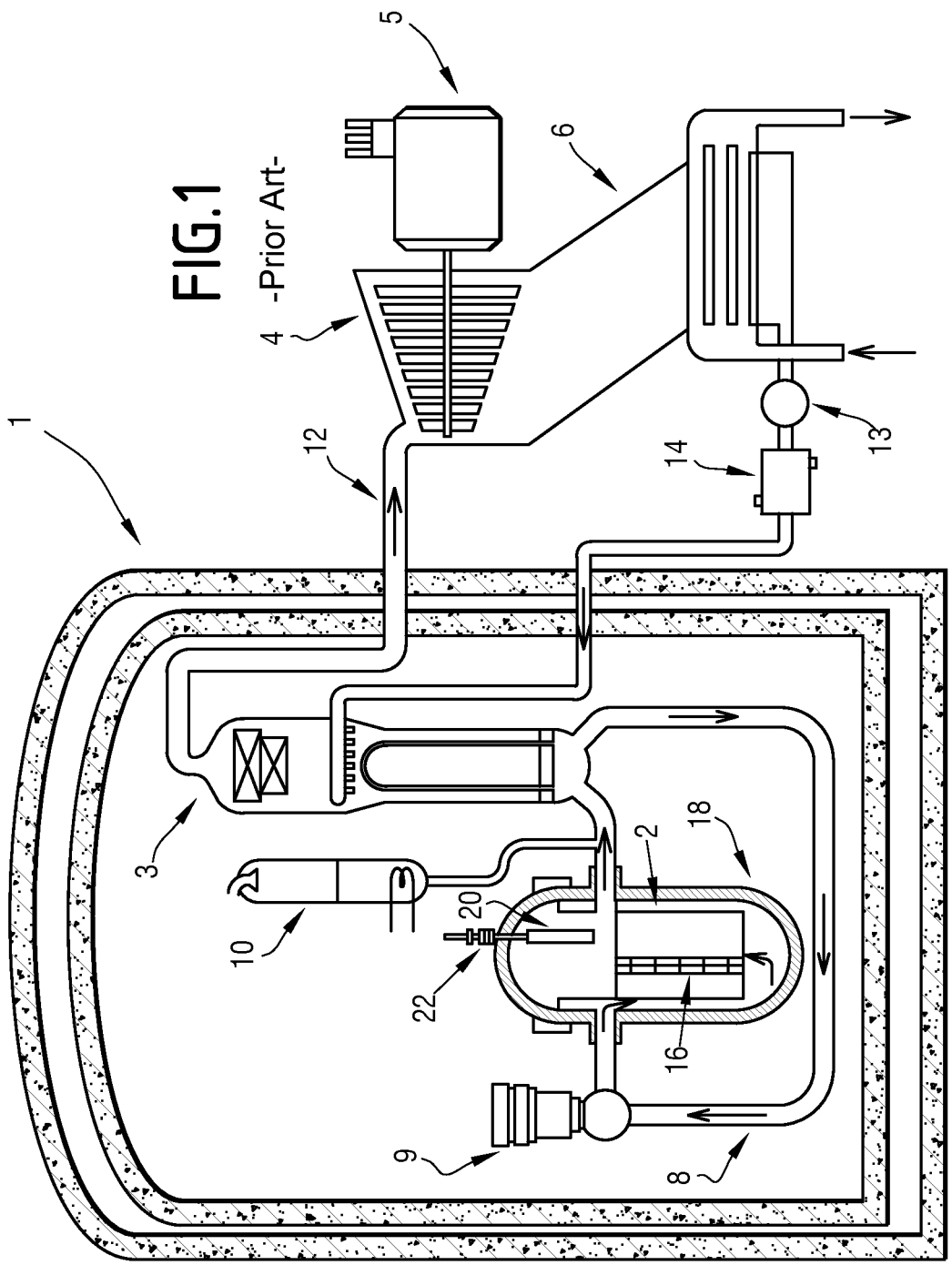
FIG. 1 is a schematic view of a pressurized water nuclear reactor.

In FIG. 1, a nuclear reactor 1, such as a pressurized water nuclear reactor, comprises, as is known in itself, a core 2, a steam generator 3, a turbine 4 coupled to an electrical energy generator 5, and a condenser 6.

The nuclear reactor 1 comprises a primary circuit 8 equipped with a pump 9 and in which pressurized water circulates, along a path embodied by the arrows in FIG. 1. This water in particular rises through the core 2 to be heated therein while providing the refrigeration of the core 2.

The primary circuit 8 further comprises a pressurizer 10 making it possible to pressurize the water circulating in the primary circuit 8.

The water of the primary circuit 8 also supplies the steam generator 3, where it is cooled while providing the vaporization of water circulating in a secondary circuit 12.

The steam produced by the steam generator 3 is channeled by the secondary circuit 12 toward the turbine 4, then toward the condenser 6, where this steam is condensed by indirect heat exchange with the cooling water circulating in the condenser 6.

The secondary circuit 12 comprises, downstream from the condenser 6, a pump 13 and a heater 14.

Traditionally, the core 2 comprises fuel assemblies 16 that are loaded in a vessel 18 according to a loading pattern. A single fuel assembly 16 is shown in FIG. 1, but the core 2 for example comprises 157 fuel assemblies 16.

The nuclear reactor 1 comprises control clusters 20 that are positioned in the vessel 18 above certain fuel assemblies 16. A single control cluster 20 is shown in FIG. 1, but the core 2 for example comprises around sixty control clusters 20.

The control clusters 20 are movable by mechanisms 22 to be inserted into the fuel assemblies 16 that they overhang.

Traditionally, each control cluster 20 comprises rods, at least some of which include a material absorbing the neutrons.

Thus, the vertical movement of each control cluster 20 makes it possible to adjust the nuclear reactivity of the reactor 1 and allows variations of the overall power P supplied by the core 2 from the nil power to the rated power PN, as a function of the pushing of the control clusters 20 into the fuel assemblies 16.

Some of said control clusters 20 are intended to regulate the operation of the core 2, for example in terms of power or temperature, and are called regulating clusters. Others are intended to stop the nuclear reactor 1 and are called stop clusters.

The control clusters 20 are joined into groups based on their nature and intended use. For example, for reactors of type 900 Mwe CPY, these groups are called G1, G2, N1, N2, R, SA, SB, SC, SD. Groups G1, G2, N1 and N2, called power groups, are used overlapping for power regulation, and group R is used for temperature regulation. Groups SA, SB, SC and SD are used for the emergency stopping of the nuclear reactor 1.

Figure 2:
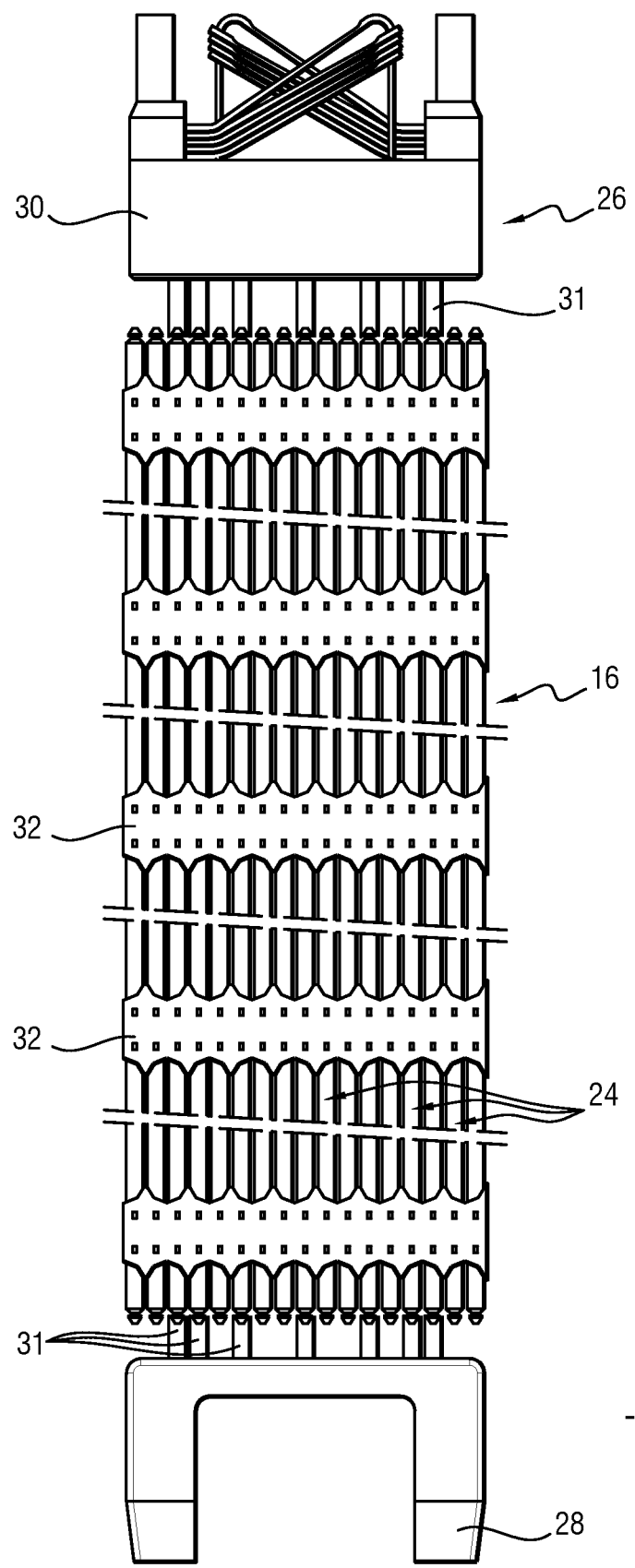
FIG. 2 is a lateral schematic view of a fuel assembly of the core of the reactor of FIG. 1.

As illustrated by FIG. 2, each fuel assembly 16 traditionally comprises an array of nuclear fuel rods 24 and a support skeleton 26 for the fuel rods 24.

The skeleton 26 conventionally comprises a lower end-piece 28, an upper end-piece 30, an array of guide tubes 31 connecting the two end-pieces 28, 30 and designed to receive the rods of the control clusters 20 and to position spacer-forming grids 32 to position the arrays of fuel rods 24 and guide tubes 31.

Figure 3:
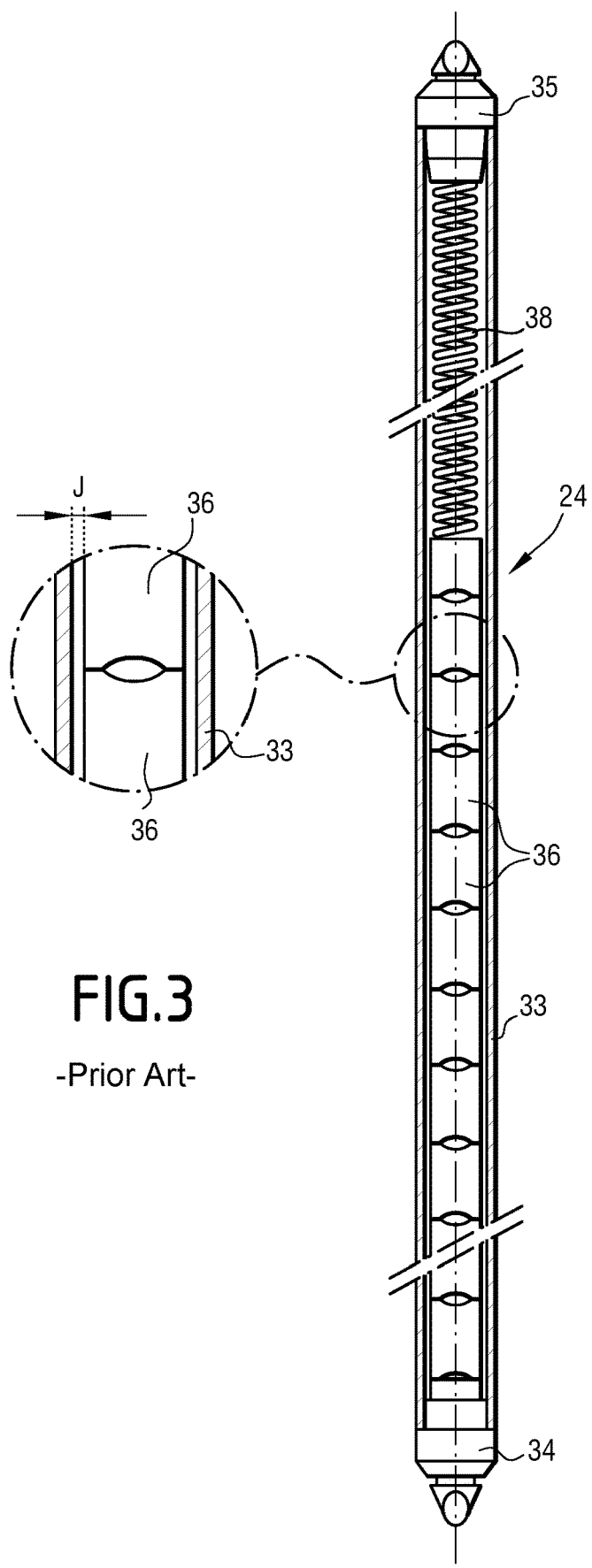
FIG. 3 is a longitudinal sectional schematic view of a fuel rod of the assembly of FIG. 2.

As illustrated by FIG. 3, each fuel rod 24 traditionally comprises a cladding 33 in the form of a tube closed at its lower end by a lower stopper 34 and at its upper end by an upper stopper 35. The fuel rod 24 comprises a series of pellets 36 stacked in the cladding 33 and bearing against the lower stopper 34. A maintaining spring 38 is positioned in the upper segment of the cladding 33 to bear on the upper stopper 35 and on the upper pellet 36.

Traditionally, the pellets 36 have a base of fissile material, for example uranium oxide, and the cladding 33 is made from zirconium alloy.

In FIG. 3, which corresponds to a fuel rod 24 as derived from manufacturing, that is to say, before irradiation, radial play J exists between the pellets 36 and the cladding 33. This is illustrated more particularly by the circled enlarged part of FIG. 3.

When the nuclear reactor 1 is going to operate, for example at its rated power PN, the fuel rod 24 will be, according to the term used in the art, conditioned.

Conditioning is essentially characterized by the closing of the play J between the pellets 36 and the cladding 33, due to the creep of the cladding 33 and the swelling of the pellets 36.

More specifically, the following steps are for example distinguished for each fuel rod 24 during irradiation:

1) Under the effect of the pressure difference between the outside (water from the primary circuit 8) and the inside of the fuel rod 24, the cladding 33 gradually deforms by creeping radially toward the inside of the fuel rod 24. All other things being equal, the creep speed of the cladding 33 is one characteristic of its component material. Furthermore, the fission products, the majority of which are retained in the pellet 36, cause swelling of the pallet 36. During this phase, the stress exerted on the cladding 33 in terms of constraints results solely from the pressure differential existing between the outside and the inside of the fuel rod 24. The stresses in the cladding 33 are compression stresses (conventionally negative).

2) The contact between the pellet 36 and the cladding 33 begins after a length of time that essentially depends on local irradiation conditions (power, neutron flux, temperature, etc.) and the material of the cladding 33. In reality, the contact is established gradually over a period that begins with gentle contact followed by the establishment of firm contact. The increased contact pressure of the pellet 36 on the inner face of the cladding 33 leads to an inversion of the stresses in the cladding 33, which become positive and tend to exert tensile stress on the cladding 33.

3) The swelling of the pellet 36 continues, and the pellet 36 then imposes its deformation on the cladding 33 toward the outside of the fuel rod 24. In the established steady state, this expansion is slow enough for the relaxation of the material of the cladding 33 to allow an equilibrium of the forces in the cladding 33. An analysis shows that under these conditions, the level of the tensile stresses is moderate (several tens of MPa) and does not present any risk with respect to the integrity of the cladding 33.

While there is no risk of breaking of the cladding 33 in a steady state due to the thermomechanical equilibrium in the cladding 33 at fairly low stress levels, a risk appears once the power supplied by the fuel rod 24 varies greatly.

Indeed, a power increase generates a temperature increase of the pellets 36 contained in the fuel rod 24 and, by heat conductance, an increase in the temperature of the cladding 33 of the fuel rod 24. Given the difference in mechanical characteristics (thermal expansion coefficient, Young's modulus) and the temperature difference between the pellet 36 of fissile material and the cladding 33 made from zirconium alloy, the pellet 36 will expand more than the cladding 33 and impose its deformation on the latter.

Furthermore, an operation at intermediate power lasting several days results in deconditioning the fuel rods 24. For the portions of the fuel rods 24 where the contact between the cladding 33 and the pellets 36 is not established, the radial play J becomes greater. Regarding the portions of the fuel rods 24 where the play J was closed, the play J can open again. In case of open play J, the compression creep of the cladding 33 by pressure effect resumes. This results in increased stresses levels in the cladding 33 when an accidental local power increase transient occurs.

Furthermore, the presence of corrosive fission products, such as iodine, in the space between the cladding 33 and the pellet 36 creates conditions favoring corrosion under stress. Thus, the deformation imposed by the pellet 36 on the cladding 33 during an accidental local power increase transient can cause a rupture of the cladding 33 by corrosion under stress by the iodine in pellet-cladding interaction (PCI) situation.

Yet such a rupture of the cladding 33 is not acceptable for safety reasons, since it may result in the release of fission products into the primary circuit 8.

Power transitions may occur during normal operation of the nuclear reactor 1, i.e., in so-called category 1 situations. Indeed, power variations may be necessary in particular to adapt to the electrical energy needs of the power grid that the generator 5 supplies. Power transients may also occur in so-called category 2 accidental situations, such as excessive charge increase, uncontrolled withdrawal of power control cluster group(s) 20, boric acid dilution or undetected fall of control clusters 20.

Starting from the state of the balance of the margins obtained in normal operation, the acceptable operating duration and intermediate power is determined so as to guarantee the non-rupture by pellet-cladding interaction of the claddings 33 present in the core 2 in case of category 2 power transition, also called class 2 power transition.

In order to guarantee the integrity of the fuel rods 24 with respect to the pellet-cladding interaction, the present disclosure determines a first threshold value of a respective operating parameter for an operation at a first power P1 of the reactor, a second threshold value of said respective operating parameter for an operation at a second power P2 of the reactor, and a third threshold value of said respective operating parameter for an operation at a third power P3 of the reactor, between the first power P1 and the second power P2.

Each threshold value of the respective operating parameter is preferably determined by calculating a margin with respect to the rupture risk of a cladding 33 by pellet-cladding interaction (PCI), this margin being called PCI margin.

Each PCI margin is a deviation relative to a characteristic property of the nuclear reactor 1, i.e., a delta of said characteristic property of the nuclear reactor 1, this deviation coming from taking account of the rupture risk of the claddings 33 by the pellet-cladding interaction.

Each PCI margin is for example chosen from among the group consisting of: a power margin and a margin in a thermomechanical property associated with the cladding 33. The characteristic property of the nuclear reactor 1, a deviation, or delta, of which is determined to calculate the PCI margin, is then the local power or the thermomechanical property associated with the cladding 33. As an optional addition, the PCI margin is next converted into another property, for example into an operating duration of the nuclear reactor 1 at an intermediate power.

One skilled in the art will understand that for a negative PCI margin, the lower the absolute value of the PCI margin is, the lower the likelihood of rupture of a cladding 33 is, and that when the PCI margin becomes nil or positive, the likelihood of rupture of a cladding 33 is nil.

Figure 4:
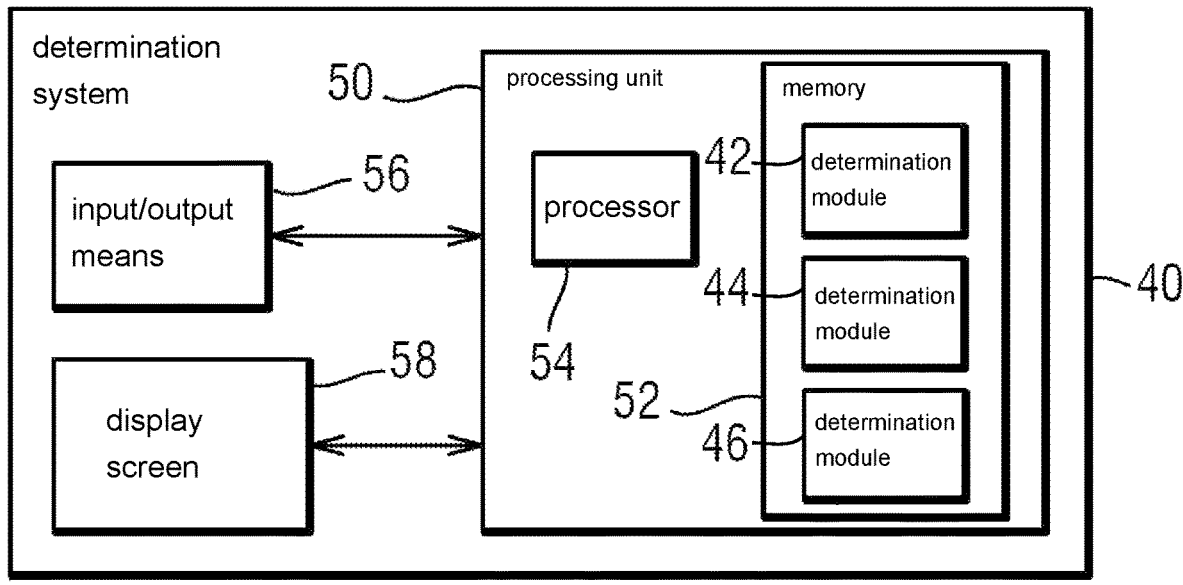
FIG. 4 is a block diagram of an electronic determination system for at least one threshold value of at least one operating parameter of the reactor of FIG. 1.

To determine the first, second and third threshold values of the respective operating parameter, an electronic system 40 is for example used, for example a computer system, for determining at least one threshold value of at least one operating parameter of the nuclear reactor 1, like that shown in FIG. 4.

The determination system 40 comprises a first determination module 42 configured to determine the first threshold value of a respective operating parameter for an operation of the reactor at the first power P1.

The determination system 40 comprises a second determination module 44 configured to determine the second threshold value of the respective operating parameter for an operation of the reactor at the second power P2.

The operation at the lower power of the first power P1 and second power P2 is an operation continued for a duration of at least 8 hours, for example, over a 24-hour sliding window, also called SOIP for sustained operation at intermediate power. The duration of the sustained operation at intermediate power can reach several days, or even several weeks or months.

The determination system 40 comprises a third determination module 46 configured to determine the third threshold value of the respective operating parameter for an operation of the reactor at the third power P3, the third power P3 being between the first power P1 and the second power P2.

In the example of FIG. 4, the determination system 40 comprises an information processing unit 50, for example made up of a memory 52 and a processor 54 associated with the memory 52. In this example, it further comprises input/output means 56 and optionally a display screen 58.

In the example of FIG. 4, the first determination module 42, the second determination module 44 and the third determination module 46 are each made in the form of software executable by the processor 54. The memory 52 of the information processing unit 50 is then able to store first determination software configured to determine the first threshold value of the respective operating parameter for an operation of the nuclear reactor 1 at the first power P1, second determination software configured to determine the second threshold value of said operating parameter for an operation of the nuclear reactor 1 at the second power P2, third determination software configured to determine the third threshold value of said operating parameter for an operation of the nuclear reactor 1 at the third power P3. The processor 54 of the information processing unit 50 is then able to execute the first determination software, the second determination software and the third determination software.

In a variant that is not shown, the first determination module 42, the second determination module 44 and the third determination module 46 are each made in the form of a programmable logic component, such as an FPGA (Field Programmable Gate Array), or in the form of a dedicated integrated circuit, such as an ASIC (Application-Specific Integrated Circuit).

Each determination module 42, 44, 46 is configured to determine the respective threshold value of the operating parameter through the calculation of a PCI margin, in particular such that the PCI margin always remains positive, particularly after a modification of the power of the reactor. Each determination module 42, 44, 46 is for example configured to determine each respective threshold value of the operating parameter, associated with a protection threshold, by calculating, for the corresponding power of the reactor, the value of said parameter corresponding to a predefined value of the PCI margin. This predefined value of the PCI margin is positive, while being relatively close to zero, or even nil, to allow a sustained operation at said corresponding power of the reactor. This predefined value of the PCI margin is for example substantially equal to 0.05 MPa when the PCI margin is expressed in the form of a deformation energy density and obtained, if applicable, from a methodology called RPM, corresponding to a first methodology for calculating the PCI margin, described hereinafter. In a variant, this predefined value of the PCI margin is substantially equal to 5 W/cm when the PCI margin is expressed in the form of a power at break and obtained, if applicable, from a methodology called power at break, corresponding to a second methodology for calculating the PCI margin, described hereinafter. One skilled in the art will further understand that each of the predefined values of the PCI margin can be converted into a margin in authorized SOIP duration, for example substantially equal to 5 days in the case of the above examples.

The operating parameter is for example selected from the following group: a temperature deviation $\Delta T$ in the core 2, a linear power $P_{lin}$, in the fuel rods 24 and a neutron flux variation over time $d\Phi/dt$ in the core 2.

The operating parameter taken into account for example depends on the type of protection system of the reactor (for example analog/digital) and the accidental transient in question. For example, a cooling accident will correspond to the parameter $\Delta T$, a fall of one of the control clusters to the parameter $d\Phi/dt$, etc.

Each determination module 42, 44, 46 is then configured to calculate said PCI margin, for example according to a first methodology, such as the RPM (Renovated PCI Methodology), for example described in document EP 1,556,870 B1.

Each determination module 42, 44, 46 is, according to this example, configured to simulate at least one operating transition of the nuclear reactor 1, calculate the value reached by a physical property G during the operating transition in at least one portion of a cladding 33 of the fuel rod 24, and determine, as PCI margin, the deviation between the maximum value reached by said calculated value during the transition and a technological limit of the fuel rod 24. In this methodology, the neutron (simulation of the power transition) and thermomechanical (calculation of a physical property G in the cladding 33) calculations are coupled.

The physical property G is for example the circumferential stress $\sigma\theta$ or the radial stress $\sigma_r$ in the cladding 33. Alternatively, the physical property G is a function of stress(es), for example of the difference for instance between the circumferential stress $\sigma\theta$ and the radial stress $\sigma_r$. Also alternatively, the physical property G is the deformation energy density DED in the cladding 33.

The transient simulated by the determination module 42, 44, 46 is preferably a transient selected from the group consisting of:
- an excessive load increase,
- an uncontrolled withdrawal of at least one group of control clusters 20,
- a fall of one of the control clusters 20, and
- an uncontrolled boric acid dilution.

The excessive load increase corresponds to a rapid increase in the steam flow rate in the steam generator 3. Such an increase causes an imbalance between the thermal power of the core 2 and the load of the steam generator 3. This imbalance leads to cooling of the primary circuit 8. Due to the moderating and/or regulating effect of the mean temperature in the core 2 by the control clusters 20, the reactivity, and therefore the neutron flux, increase in the core 2. Thus, the overall power P supplied by the core 2 increases quickly.

The uncontrolled withdrawal of groups of control clusters 20 while the reactor is operating causes an uncontrolled increase in the reactivity. This results in a rapid increase in the overall nuclear power P and the heat flux in the core 2. Until a discharge valve or pressure release valve of the secondary circuit 12 is opened, the extraction of heat in the steam generator 3 increases less quickly than the power given off in the primary circuit 8. This results in an increase of the temperature and the pressure of the water in the primary circuit 8. To simulate this transient, a withdrawal of the power groups is assumed at the maximum speed, for example of 72 pitches/min on certain types of pressurized water reactors, until complete removal of the control clusters 20 in question.

If one or several control clusters 20 fall into the core 2, there is an immediate reduction in reactivity and overall power P in the core 2. Without protective action, the imbalance thus caused in the primary circuit 8 and the secondary circuit 12 causes a drop in the entry temperature of the water into the core 2, as well as an increase in the nuclear power by the counter-reactions, for example by Doppler effect, and the temperature regulation, until reaching a new breakeven point between the primary circuit 8 and the secondary circuit 12. The presence in the core 2 of the nuclear reactor 1 of the control cluster(s) 20 having fallen causes a deformation of the radial power distribution, while the removal of the regulating group leads to an axial modification of the power.

The uncontrolled boric acid dilution leads to a decrease of the boron concentration of the water in the primary circuit 8 of the nuclear reactor 1 due to a failure of a system of the nuclear reactor 1. It causes an insertion of reactivity, which leads to a local increase of the linear power in the core 2.

The technological limit of a fuel rod 24 is established from values reached by the physical property G in claddings during experimental power ramps, done in test reactors, on fuel rod segments representative of fuel rods 24 and previously irradiated in a nuclear power reactor and having different combustion rates. The technological limit of the physical property G corresponds to the minimum value of the physical property G from among the values reached during experimental tests. Below this limit, no fuel rod 24 rupture by pellet-cladding interaction is considered. Above it, the likelihood of a cladding 33 rupture by pellet-cladding interaction is not nil.

In a variant, each determination module 42, 44, 46 is configured to calculate said PCI margin using a second methodology different from the first methodology, such as the methodology called power at break methodology, also denoted methodology $P_{rupt}$.

According to this variant, each determination module 42, 44, 46 is for each fuel assembly 16, configured to simulate an evolution of the operation of the nuclear reactor 1 by applying, to each fuel rod 24, a nuclear power ramp from the nil power, in order to calculate the values reached by a physical property G locally in each cladding 33 of each fuel rod 24 present in the core 2 and to determine, if applicable, a local power at break equal to the power associated with the local power of the physical property G when this value reaches the technological limit. If the technological limit is not reached, the local power at break at the considered point is infinite. In this second methodology, the simulated power ramp is a theoretical ramp, independent of the neutronic studies, and the thermomechanical calculations are then uncoupled from the neutronic calculations.

Figure 6:
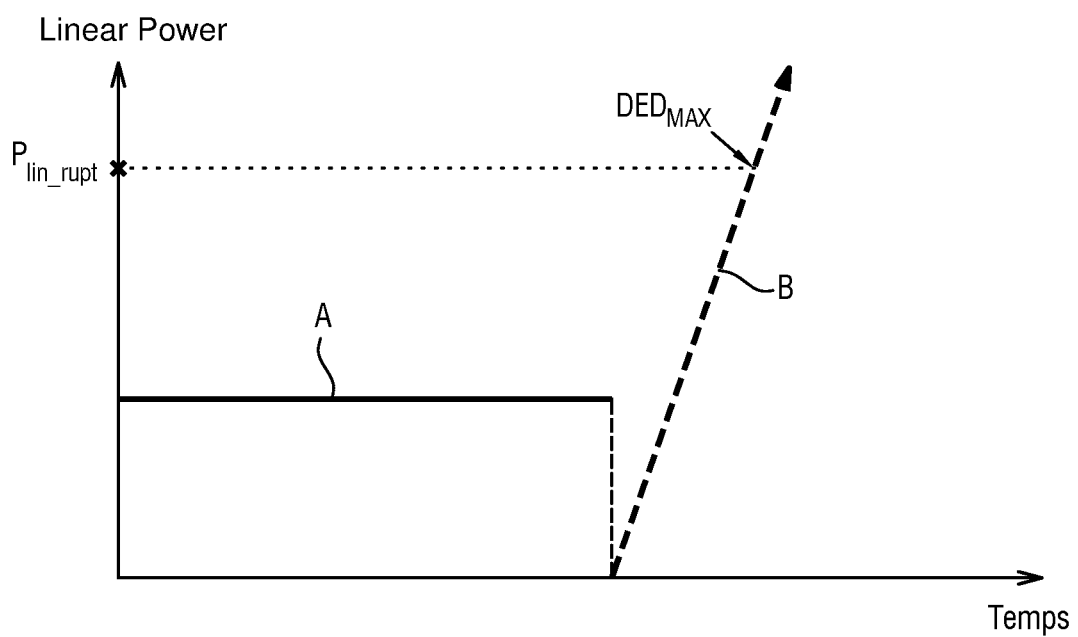
FIG. 6 is a curve illustrating the simulation of a power ramp to determine a power at break to calculate the PCI margin according to one exemplary embodiment.

According to this variant, in the example of FIG. 6, after a level A at substantially constant power, a power ramp B from the nil power is applied [to] each axial mesh of each fuel rod 24. In the example of FIG. 6, the power ramp B is a linear power ramp, and the physical property G is the deformation energy density DED in the cladding 33, the power at break $P_{lin\_rupt}$ then corresponding to the maximum deformation energy density $DED_{MAX}$, i.e., to the value of the deformation energy density reached when the cladding 33 ruptures.

The estimated maximum power is for example a power envelope at any point of the core 2 and taking account of all of the limiting transitions. This estimated maximum power in particular takes into account power transitions that may occur in so-called category 2 accidental situations.

One skilled in the art will then understand that, in the example described above, each determination module 42, 44, 46 is configured to calculate a PCI margin indifferently according to the first methodology, called renovated PCI methodology, or according to the second methodology, called power at break methodology.

One skilled in the art will further understand that for the determination of the first, second and third successive threshold values for a respective operating parameter, the first, second and third determination modules 42, 44, 46 are preferably configured to calculate a corresponding PCI margin according to a same methodology among the first methodology and the second methodology.

One skilled in the art will further understand that the first, second and third determination modules 42, 44, 46 are preferably made in the form of a single determination module configured to calculate each of the first, second and third successive threshold values for the respective operating parameter. According to this preferred exemplary embodiment, this unique determination module is made in the form of software executable by the processor 54, or in the form of a programmable logic component, such as an FPGA, or in the form of a dedicated integrated circuit, such as an ASIC.

Figure 8:
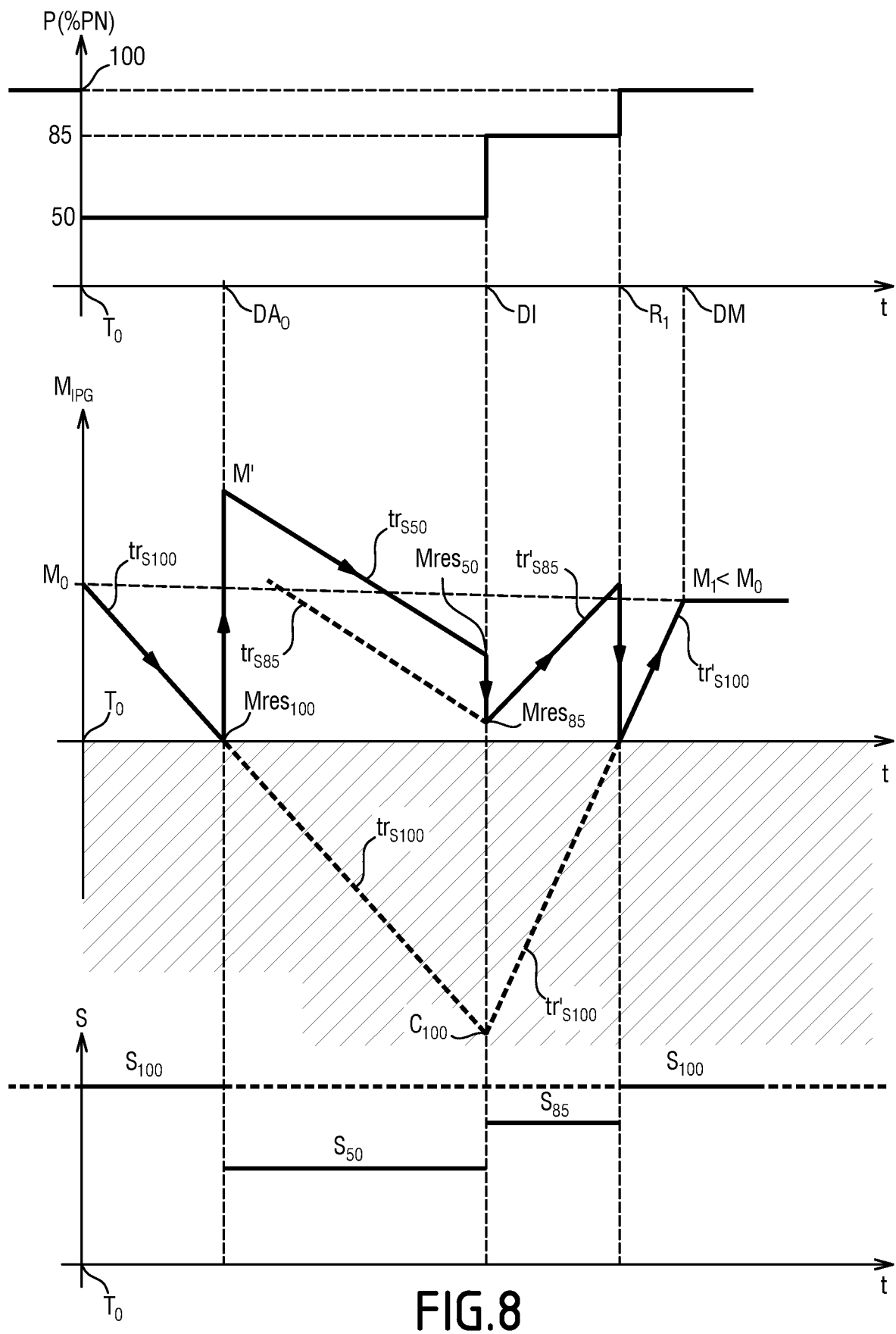
Figure 9:
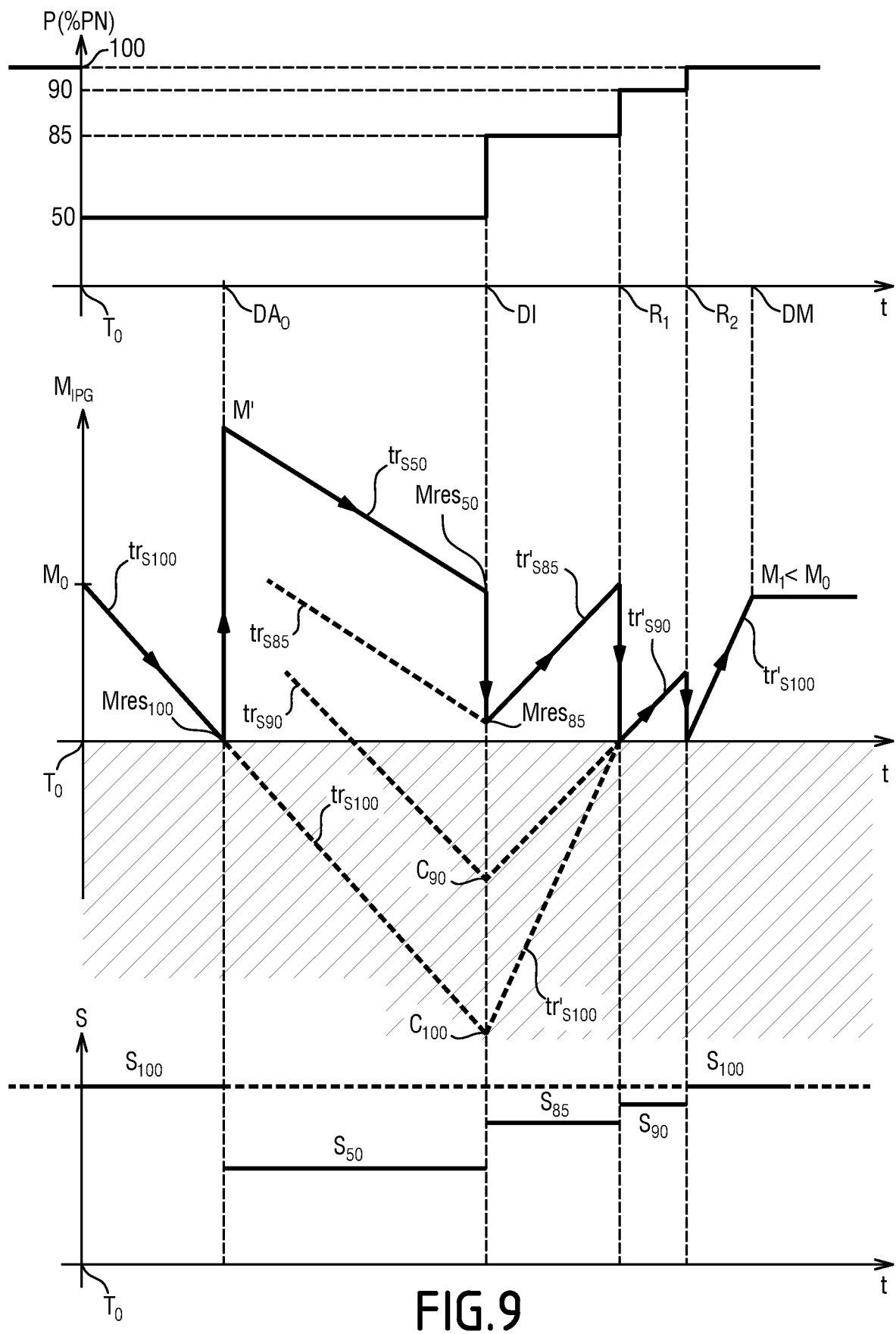

Additionally, the determination system 40 is configured to take account of a target PCI margin $M_1$ after a thermomechanical deconditioning followed by a thermomechanical reconditioning of the fuel rods 24 below the PCI margin $M_0$ taken into account before the thermomechanical deconditioning of the fuel rods 24, as shown in FIGS. 8 and 9, where $M_1 < M_0$. This makes it possible to account for the fact that, all other things being equal, the PCI margin decreases slightly during an irradiation cycle, with the combustion rate.

The target PCI margin $M_1$ taken into account after a thermomechanical deconditioning followed by a thermomechanical reconditioning of the fuel rods 24 leading to a local combustion rate of the fuel rods corresponds, starting from the PCI margin $M_0$ existing before the thermomechanical deconditioning of the fuel rods (24), to the PCI margin that would have resulted from an operation of the reactor 1 at its rated power PN until obtaining the same local combustion rate.

Figure 5:
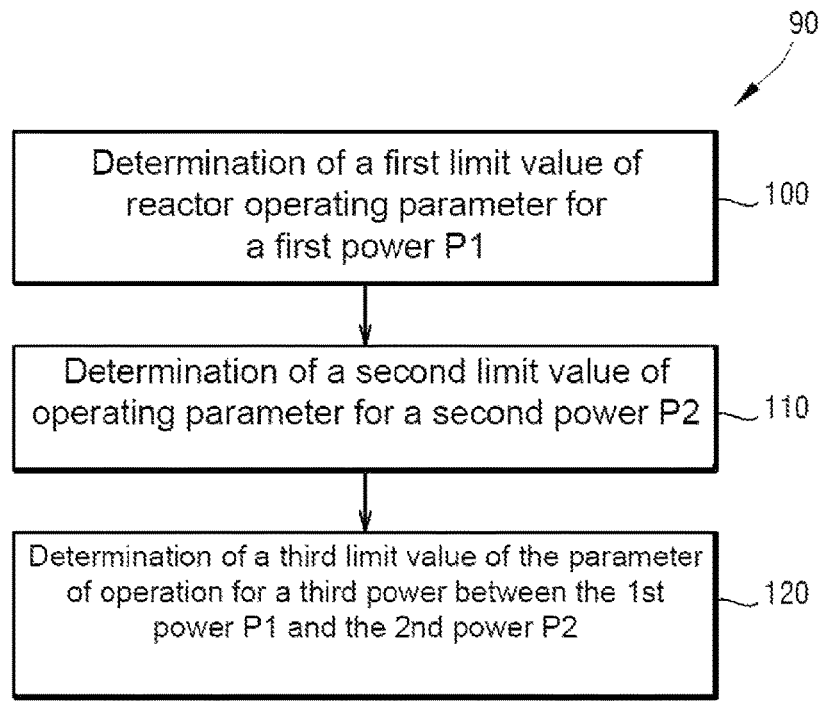
FIG. 5 is a flowchart of the determination method for at least one threshold value of at least one operating parameter of the nuclear reactor, implemented by the electronic system of FIG. 4.

The operation of the determination system 40 will now be explained in more detail in light of FIG. 5, showing a flowchart of the determination method 90, as well as FIGS. 7 to 9, each showing a set of evolution curves of the power over time, of the PCI margin and of the protection threshold for different examples of deconditioning and/or reconditioning of the fuel rods 24.

During a first step 100, the determination system 40 determines, via its first determination module 42, the first threshold value of the respective operating parameter, associated with a first protection threshold, for the operation of the nuclear reactor 1 at the first power P1.

Figure 7:
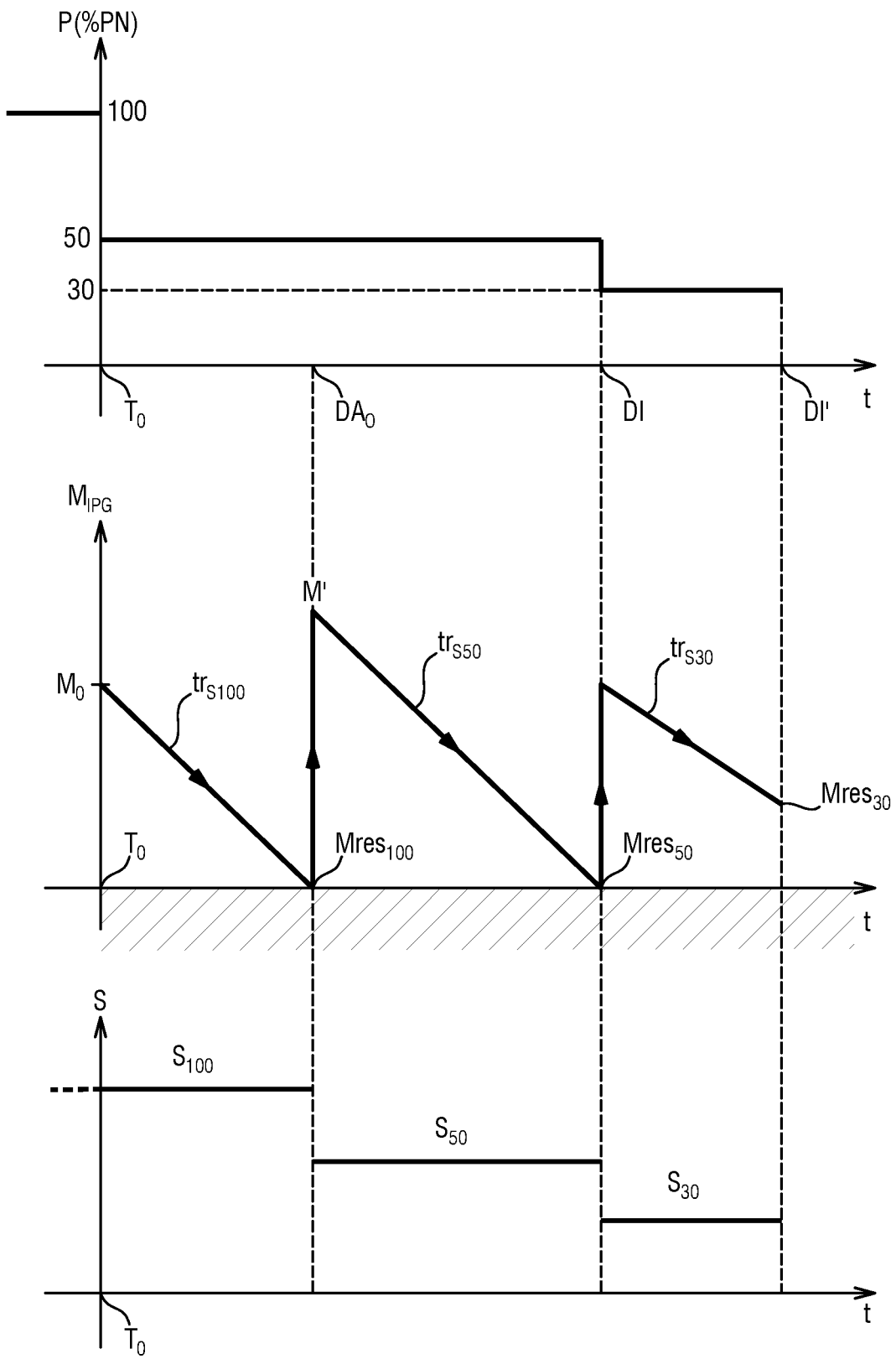
FIGS. 7 to 9 each show a set of schematic evolution curves, as a function of time elapsed since the transition to sustained operation at intermediate power, of the power, the PCI margin and the protection threshold for different examples of thermomechanical deconditioning and/or reconditioning of fuel rods.

In the deconditioning example of FIG. 7, the first power P1 is the rated power PN of the nuclear reactor 1, the power P initially being substantially equal to 100% PN. The first determined protection threshold is then the threshold S100 corresponding to this operation at 100% PN.

FIGS. 8 and 9 essentially illustrate examples of reconditioning, the considered first power P1 is an intermediate power of the nuclear reactor 1, such as the intermediate power equal to 50% PN. The determined first protection threshold is then the threshold S50 corresponding to this operation at 50% PN.

The determination system 40 next determines, during the next step 110 and via its second determination module 44, the second threshold value of the respective operation parameter, associated with a second protection threshold, for the operation of the nuclear reactor 1 at the second power P2.

In the deconditioning example of FIG. 7, the second power P2 is an intermediate power of the nuclear reactor 1, such as the intermediate power equal to 30% PN. The determined second protection threshold is then the threshold S30 corresponding to this operation at 30% PN.

In the reconditioning example of FIGS. 8 and 9, the second power P2 is the rated power PN of the nuclear reactor 1, as shown by the final power P equal to 100% PN. The determined second protection threshold is then the threshold S100 corresponding to this operation at 100% PN.

Lastly, the determination system 40 next determines, during the following step 120 and via its third determination module 46, the third threshold value of the respective operating parameter, associated with a third protection threshold, for the operation of the nuclear reactor 1 at the third power P3 of the reactor, the third power P3 being between the first power P1 and the second power P2.

In other words, the third threshold value of the operating parameter associated with a third protection threshold corresponds to a power level between the first power P1 and the second power P2.

In addition, the method further comprises a step, not shown in FIG. 5, consisting of operating the nuclear reactor 1 by verifying that the value of the operating parameter $\Delta T$, $P_{lin}$, $\Phi$ is less than the respective threshold value of the operating parameter among the first, second and third threshold values, determined during the preceding steps 100, 110, 120, for the operation of the nuclear reactor 1 at the corresponding power among the first, second and third powers P1, P2, P3.

In practice, in case of reduction of the power of the nuclear reactor 1, the power of the nuclear reactor 1 will be modified first, before adapting the protection threshold secondly to this power change, from the respective threshold value of the operating parameter calculated by the determination system 40.

Conversely, in case of reduction of the power of the nuclear reactor 1, the protection threshold is adapted in advance relative to this power change of the nuclear reactor 1.

To simplify the drawings, these small time shifts are not shown in FIGS. 7 to 9.

In the deconditioning examples of FIG. 7, the power level between the first power P1 and the second power P2 is the intermediate power equal to 50% PN. The determined third protection threshold is then the threshold S50 corresponding to this operation at the power level equal to 50% PN.

In the reconditioning example of FIG. 8, the power level between the first power P1 and the second power P2 is the intermediate power equal to 85% PN. The determined third protection threshold is then the threshold S85 corresponding to this operation at the power level equal to 85% PN.

The reconditioning example of FIG. 9 corresponds to a case with two successive intermediate power levels, a first power level between the first power P1 and the second power P2 being the intermediate power equal to 85% PN and a second power level between the first power P1 and the second power P2 being the intermediate power equal to 90%. Two third protection thresholds, associated with the two third threshold values of the operating parameter, are then determined, a third protection threshold being the threshold S85 corresponding to this operation at the first intermediate power level equal to 85% PN, and the other third protection threshold being the threshold S90 corresponding to this operation at the second intermediate power level equal to 90% PN.

It should further be noted in FIGS. 8 and 9 that the target PCI margin $M_1$ taken into account by the determination system 40 after a thermomechanical deconditioning followed by a thermomechanical reconditioning of the fuel rods 24 is slightly smaller than the PCI margin $M_0$ existing before the thermomechanical deconditioning of the fuel rods 24, in light of the decrease, all other things being equal, of the PCI margin with the combustion rate.

The operation of the nuclear reactor 1 in each of the examples of FIGS. 7 to 9 will now be described in more detail.

In FIG. 7, at instant $T_0$ of an irradiation cycle, the power of the nuclear reactor 1 is reduced from its rated power PN to the intermediate threshold of equal power, in the illustrated example, to 50% PN. The PCI margin existing at this instant $T_0$ of the cycle, denoted $M_0$, is first consumed according to a slope $trs_{100}$. For convenience, the slopes tr and tr' are shown linearly in FIGS. 7, 8 and 9. In reality, the slopes tr and tr' have a more complex analytical formulation and for example follow a curve of the inverse exponential type: $e^{-t}$ for tr and $1-e^{-t}$ for tr', where t represents time. In a variant, they are approximated by a series of linear segments.

The maximum operating duration under these conditions, corresponding to the instant $DA_0$ counted down from $T_0$, that is to say $DA_0-T_0$, is that making it possible to retain a positive residual PCI margin $Mres_{100}$ at all instants. When it is necessary for the SOIP duration to be greater than the duration $DA_0-T_0$, the calculation of the successive protection thresholds $S_{50}$, $S_{30}$ makes it possible to restore a PCI margin. Indeed, the protection thresholds of the nuclear reactor 1 are increasing monotone functions of the power P of the nuclear reactor 1.

The new margin M', visible in FIG. 7 during the change of protection thresholds from $S_{100}$ to $S_{50}$, is in turn consumed according to a new slope $trs_{50}$. At this intermediate power level at 50% PN, the maximum operating duration, corresponding to the intermediate instant DI, is again that making it possible to keep a positive residual PCI margin $Mres_{50}$ at all times, and the use of the following protection threshold $S_{30}$ makes it possible to restore a PCI margin, with a new margin M".

This new margin M", visible in FIG. 7 during the change of protection thresholds from $S_{50}$ to $S_{30}$, is in turn consumed according to a new slope $trs_{50}$ until another intermediate instant DI', corresponding to the end of the SOIP in this example and for which the residual PCI margin $Mres_{30}$ remains greater than zero.

One skilled in the art will then observe that determining the third threshold value of said respective operating parameter, here corresponding to the protection threshold $S_{50}$ for the intermediate power level equal to 50% PN, ultimately makes it possible to have a greater residual PCI margin, while further having a portion of the SOIP done at the third power P3, here equal to 50% PN, which is greater than the final intermediate power, here the second power P2 equal to 30% PN.

FIG. 8 first illustrates a deconditioning similar to that of FIG. 7, but without the presence of an intermediate power level during this deconditioning, the SOIP only being done at 50% PN. This deconditioning is, at the end of the SOIP, followed by a reconditioning, the end of the SOIP corresponding to the intermediate instant DI.

This FIG. 8 then illustrates the implementation during the thermomechanical reconditioning of fuel rods 24 from this intermediate instant DI. The use, during this reconditioning, of the intermediate level at the third power P3 equal to 85% PN, between the first power P1, here equal to 50% PN, and the second power P2, here equal to 100% PN, makes it possible to perform this reconditioning under much better safety conditions. Indeed, the direct return to the 100% PN level after the duration of the SOIP corresponding to the instant DI, that is to say, $DI-T_0$, would create a PCI margin that would temporarily become negative in a hypothetical class 2 situation until reaching the point $C_{100}$, corresponding to the lower end of the curve $trs_{100}$ in FIG. 8, the PCI margin under these conditions becoming positive at the earliest at the instant $R_1$, which defines the first reconditioning level before the possible return to the rated power PN. The maximum power grade of the intermediate power level, such as 85% PN in the example of FIG. 8, is determined so as to have a positive PCI margin, corresponding to the residual PCI margin $Mres_{85}$, at the beginning of the reconditioning (intermediate instant DI). From this minimum grade $Mres_{85}$, the PCI margin is next regained according to a slope $tr'_{s85}$. The protection threshold of the reactor is raised to the grade associated with the intermediate power level, such as $S_{85}$ in the example of FIG. 8. At the instant $R_1$, the nuclear reactor 1 is used again at its rated power PN, the power P corresponding to 100% PN in FIG. 8, with the corresponding protection threshold $S_{100}$.

In order to further optimize the rise toward the rated power PN during the thermomechanical reconditioning of the fuel rods 24 from the intermediate instant DI, one skilled in the art will observe that the determination system 40 also makes it possible to determine several intermediate power levels, that is to say, several third powers P3 with separate and increasing successive values, between the first power P1 and the second power P2, as illustrated in FIG. 9, with a first intermediate level at 85% PN and an associated protection threshold $S_{85}$, followed by a second intermediate level at 90% PN and an associated protection threshold S90 from the instant $R_1$. In FIG. 9, at the instant $R_2$, the nuclear reactor 1 is used again at its rated power PN, with the corresponding protection threshold $S_{100}$.

Similarly, one skilled in the art will understand that in order to further optimize the decrease toward the minimum intermediate power during the thermomechanical deconditioning of the fuel rods 24 from the instant $T_0$, the determination system 40 also makes it possible to determine several intermediate power levels, that is to say, several third powers P3 with separate and decreasing successive values, between the first power P1 corresponding to the rated power PN and the second power P2 corresponding to the minimum intermediate power at the end of SOIP.

In addition, when the nuclear reactor 1 is once again at its rated power PN, at the end of the thermomechanical reconditioning of the fuel rods 24, if a new SOIP must be done during the same irradiation cycle, a maintenance period at 100% PN is preferably required in order to guarantee a PCI margin equivalent to the PCI margin that would have resulted from an operation without SOIP. The duration of this maintenance period at 100% PN is for example, conservatively, greater than or equal to the duration of the SOIP, or optimally equal to the duration corresponding to the instant DM at which the margin $M_1$ is reached, from the instant of the return to the rated power PN, that is to say, DM-$R_1$ in the example of FIG. 8, or DM-$R_2$ in the example of FIG. 9.

Thus, the determination method 90 and the determination system 40 make it possible, in addition to the determination of the first and second threshold values of the operating parameter, to determine a third threshold value of this respective operating parameter for the operation of the nuclear reactor 1 at the third power P3 between the first power P1 and the second power P2, that is to say, an intermediate protection threshold, in particular in order to gain operating safety, the residual PCI margin corresponding to this intermediate power level and to the associated protection threshold then being greater than if the nuclear reactor 1 had operated directly at the second power P2.

As previously illustrated in light of FIGS. 7 to 9, this increased operating safety is verified both during a deconditioning of the fuel rods 24 where the second power P2 corresponds to the minimum intermediate power, and during a reconditioning of the fuel rods 24 where the second power P2 corresponds to the rated power PN.

The determination method 90 and the determination system 40 thus allow a better match between fuel management and the maneuverability of the nuclear reactor 1 for the operator: increased PCI margins, possibility of extending SOIP durations.

One can thus see that the determination method 90 and the determination system 40 make it possible to better use the capacities of the nuclear reactor 1, while retaining a safe operation.

Upon reading the above description, one skilled in the art will understand that a power level refers to an operation of the nuclear reactor at said power, in particular at the third power, during a non-negligible duration relative to the operating duration of the reactor at least at one of the first and the second power, as shown by FIGS. 7 to 9.

In other words, a power level corresponds to a minimum operating duration of the reactor at said power, such as a duration greater than one hour.

One skilled in the art will in particular understand the power level therefore differs from a transient operation, that is to say, of short duration, at said power. One skilled in the art will likewise understand that a power level differs from a periodic operation at said power during a power variation between a first power and a second power.

What is claimed is:

1. A method for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the method being implemented by an electronic determination system and comprising:
determining a first threshold value of a respective operating parameter for an operation of the nuclear reactor at a first power;
determining a second threshold value of a respective operating parameter for an operation of the nuclear reactor at a second power,
the operation at the lower power of the first and second powers being an operation continued for a duration of at least 8 hours over a 24-hour sliding window; and
determining a third threshold value of the respective operating parameter for an operation of the nuclear reactor at a third power, the third power being between the first power and the second power,
the nuclear reactor being in a thermomechanical deconditioning mode of the fuel rods, the first power being greater than the second power, the nuclear reactor being intended to operate successively at the first power, the third power and the second power during the thermomechanical deconditioning mode of the fuel rods, the third power corresponding to a power level in the thermomechanical deconditioning mode.

2. The method according to claim 1, wherein the first power preferably being substantially equal to the rated power of the nuclear reactor.

3. The method according to claim 1, wherein the second power is substantially equal to a target power for a sustained operation at intermediate power of the nuclear reactor.

4. The method according to claim 1, wherein the respective operating parameter is selected from the following group: a temperature deviation in the core, a linear power in the fuel rods and a neutron flux variation in the core.

5. The method according to claim 1, wherein the method further comprises:
operating the nuclear reactor while verifying that the value of the operating parameter is below the respective threshold value of the operating parameter among the first, second and third threshold values for the operation of the nuclear reactor at the corresponding power among the first, second and third powers.

6. A non-transitory computer readable medium comprising a computer program comprising software instructions which, when executed by a computer, carry out the method according to claim 1.

7. The method according to claim 1, wherein the power level corresponds to an operating duration of the nuclear reactor at said power greater than one hour.

8. The method according to claim 7, wherein the first power is substantially equal to a target power for a sustained operation at intermediate power of the nuclear reactor.

9. The method according to claim 7, wherein the second power is substantially equal to the rated power of the nuclear reactor.

10. The method according to claim 1, wherein each threshold value of the respective operating parameter is determined via a calculation of a PCI margin.

11. The method according to claim 10, wherein the calculation of the PCI margin comprises:

ii) simulating at least one operating transition of the nuclear reactor,
iii) calculating a value reached by at least one physical property during the operating transition in at least part of a cladding of a fuel rod, and
iv) determining, as the PCI margin, a deviation between a maximum value reached by the value, calculated at ii), during the operating transition and a technological limit of the fuel rod.

12. The method according to claim 11, wherein the transition simulated at ii) is a transition chosen from among the group consisting of:
an excessive load increase,
an uncontrolled withdrawal of at least one group of control clusters,
a fall of one of the control clusters, and
an uncontrolled boric acid dilution.

13. The method according to claim 11, wherein the physical property is chosen from among the group consisting of:
a constraint or a constraint function in the cladding; and
a deformation energy density in the cladding.

14. An electronic system for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the electronic system comprising:
a first determination module configured to determine a first threshold value of a respective operating parameter for an operation of the nuclear reactor at a first power;
a second determination module configured to determine a second threshold value of a respective operating parameter for an operation of the nuclear reactor at a second power,
the operation at the lower power of the first and second powers being an operation continued for a duration of at least 8 hours over a 24-hour sliding window; and
a third determination module configured to determine a third threshold value of the respective operating parameter for an operation of the nuclear reactor at a third power, the third power being between the first power and the second power,
the nuclear reactor being in a thermomechanical deconditioning mode of the fuel rods, the first power being greater than the second power, the nuclear reactor being intended to operate successively at the first power, the third power and the second power during the thermomechanical deconditioning mode of the fuel rods, the third power corresponding to a power level in the thermomechanical deconditioning mode.

15. A method for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the method being implemented by an electronic determination system and comprising:
determining a first threshold value of a respective operating parameter for an operation of the nuclear reactor at a first power;
determining a second threshold value of the respective operating parameter for an operation of the nuclear reactor at a second power,
the operation at the lower power of the first and second powers being an operation continued for a duration of at least 8 hours over a 24-hour sliding window; and
determining a third threshold value of the respective operating parameter for an operation of the nuclear reactor at a third power, the third power being between the first power and the second power,
the nuclear reactor being in a thermomechanical reconditioning mode of the fuel rods, and the first power is less than the second power, the nuclear reactor being intended to operate successively at the first power, the third power and the second power during the thermomechanical reconditioning mode of the fuel rods, the third power corresponding to a power level in the thermomechanical reconditioning mode.

16. The method according to claim 15, wherein the power level corresponds to an operating duration of the nuclear reactor at said power greater than one hour.

17. A method for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the method being implemented by an electronic determination system and comprising:
determining a first threshold value of a respective operating parameter for an operation of the nuclear reactor at a first power;
determining a second threshold value of the respective operating parameter for an operation of the nuclear reactor at a second power,
the operation at the lower power of the first and second powers being an operation continued for a duration of at least 8 hours over a 24-hour sliding window; and
determining a third threshold value of the respective operating parameter for an operation of the nuclear reactor at a third power, the third power corresponding to a power level and being between the first power and the second power,
the method further comprising operating the nuclear reactor while verifying that the value of the operating parameter is below the respective threshold value of the operating parameter among the first, second and third threshold values for the operation of the nuclear reactor at the corresponding power among the first, second and third powers,
during the operation of the nuclear reactor, after a thermomechanical deconditioning followed by a thermomechanical reconditioning of the fuel rods leading to a local combustion rate of the fuel rods, a minimum operating duration of the nuclear reactor at its rated power before a new thermomechanical deconditioning of the fuel rods is the duration corresponding to reaching a target PCI margin,
the target PCI margin corresponding, starting from a PCI margin existing before the thermomechanical deconditioning of the fuel rods, to a PCI margin that would have resulted from an operation at rated power of the reactor until obtaining the same local combustion rate.

18. An electronic system for determining at least one threshold value of at least one operating parameter of a nuclear reactor comprising a core in which fuel assemblies are loaded, the fuel assemblies comprising fuel rods each including nuclear fuel pellets and a cladding surrounding the pellets, the electronic system comprising:
a first determination module configured to determine a first threshold value of a respective operating parameter for an operation of the nuclear reactor at a first power;

a second determination module configured to determine a second threshold value of a respective operating parameter for an operation of the nuclear reactor at a second power, the operation at the lower power of the first and second powers being an operation continued for a duration of at least 8 hours over a 24-hour sliding window; and a third determination module configured to determine a third threshold value of the respective operating parameter for an operation of the nuclear reactor at a third power, the third power being between the first power and the second power, the nuclear reactor being in a thermomechanical reconditioning mode of the fuel rods, and the first power is less than the second power, the nuclear reactor being intended to operate successively at the first power, the third power and the second power during the thermomechanical reconditioning mode of the fuel rods, the third power corresponding to a power level in the thermomechanical reconditioning mode.

* * * * *